UNITED STATES PATENT OFFICE.

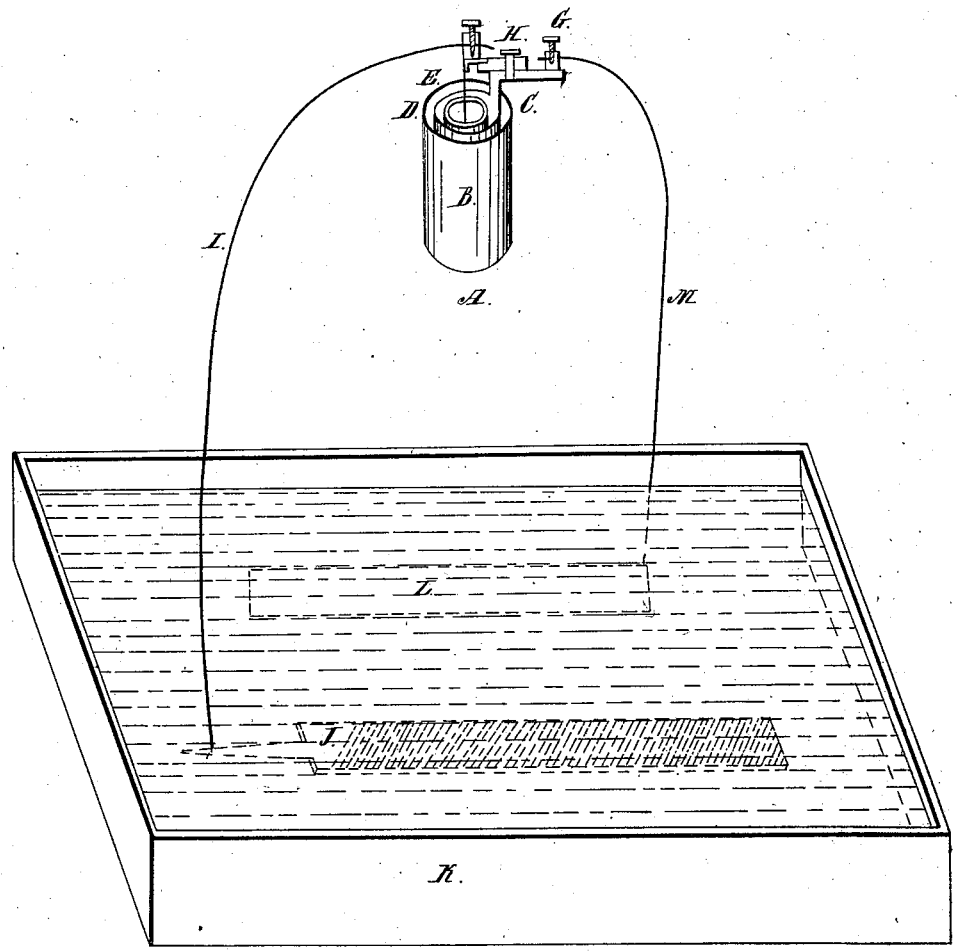

WILLIAM B. GILLETT, OF AUBURN, NEW YORK.

IMPROVEMENT IN METHODS OF SHARPENING FILES, &c.

Specification forming part of Letters Patent No. 27,046, dated February 7, 1860.

*To all whom it may concern:*

Be it known that I, WILLIAM B. GILLETT, of Auburn, in the county of Cayuga and State of New York, have invented a new and Improved Mode of Recutting or Sharpening Worn-Out Files; and I do hereby declare that the following is a full and exact description thereof, reference being had to the accompanying drawings, and to letters of reference marked thereon.

The nature of my invention consists in decomposing a solution of acid or of a salt by passing a current of electricity or galvanism through the said solution in such a manner that the oxygen or other corrosive element, upon being liberated, shall attack and dissolve the substance of a file immersed in the said solution, thereby sharpening the teeth of the said file, the operation being terminated when the file has become fit for use.

To enable others skilled in the art to use my invention, I will proceed to describe its operation and the apparatus employed.

I commonly use a galvanic battery known as "Prof. Grove's;" but any form of battery may be used, or the file may be so connected with a plate of other metal as to form with that metal a galvanic battery. The file, being connected by a wire with the platinum of the battery, is immersed in a bath of sulphuric acid diluted with about four parts of water to one of acid; or a solution of any suitable salt in water may be used. A metallic plate, being connected by a wire with the zinc of the battery, is also immersed in the same solution with the file. I find it convenient to use instead of the said metallic plates a lining of sheet metal covering the inner surface of a box to contain the acid, the said lining of sheet metal being connected with the zinc of the battery by a wire; but the metallic plate above mentioned will serve to illustrate the principle.

In the accompanying drawing, A represents a Grove's battery, of which B is the outside cup, of earthenware or glass; C, the cylinder, of zinc; D, the porous earthen cup; E, the platinum; F G, screws for attaching wires; H, insulator; I, wire connecting the file with the platinum; J, file; K, acid bath; L, metallic plate; M, wire connecting the plate with the zinc of the battery.

The file being immersed and connected, as above described, nitric acid is poured into the porous cup D in contact with the platinum, and dilute sulphuric acid into the outside cup, B.

The operation is as follows: Electricity is generated in the cup B by the action of the dilute acid upon the zinc, passing through the porous cup D. The current is attracted by the platinum and conducted by the wire I to the file J, passing through the acid or saline solution to the metallic plate L. It is conducted to the zinc C by the wire M, thus making a complete circuit. In passing through the acid or saline bath K the electricity decomposes the acid or salt, and also the water. The oxygen or other corrosive element attacks the file, dissolving and carrying off the particles of metal along with the hydrogen to the metallic plate. By moving the metallic plate nearer to any part of the file the action is increased at that part, thus enabling the operator to control the operation. By increasing or diminishing the number of cups in the battery the action upon the file is increased or diminished.

By the above-described process I am enabled to recut or sharpen and render fit for use worn-out rasps and files of every description without removing the temper or in any way injuring the quality of the steel. When the operation is conducted with ordinary care the teeth are made quite sharp and cut equally as well as new files.

Before commencing to cut files by the above-described process they should be made clean by boiling in a strong alkaline solution or any other suitable method.

When the files are sufficiently acted upon by the above process, which may be known by feeling the points or edges of the teeth to be sharpened, they are removed from the solution and properly washed with water or an alkaline solution to remove the acid and oiled to prevent rust.

I am aware that files have been acted upon by acids for the purpose of sharpening them. This I do not claim as my invention when done without a current of electricity.

I do not claim the general principle of electro-etching or dissolving metals in whole or in part by means of electricity, as this is known and practiced for a variety of purposes.

I do not claim any particular form of apparatus for generating the electricity to be used in the above-described process.

I do not claim the use of any particular acid or solution to the exclusion of others which may produce the same effect.

I claim as my invention and desire to secure by Letters Patent—

The application of the electro-chemical process herein described for the purpose of recutting or sharpening steel rasps and files in the manner aforesaid, or any other substantially the same and which will produce the intended effect.

WILLIAM B. GILLETT.

Witnesses:
F. G. DAY,
J. T. LANEHART.